United States Patent [19]
Groves et al.

[11] 4,023,597
[45] May 17, 1977

[54] DISTRIBUTORS

[75] Inventors: James Dennis Groves, Redcar; Harold Edward Haigh, Norton-on-Tees, both of England

[73] Assignee: Tioxide Group Limited, Billingham, England

[22] Filed: Nov. 6, 1974

[21] Appl. No.: 521,380

[30] Foreign Application Priority Data

Dec. 20, 1973 United Kingdom ............. 59250/73

[52] U.S. Cl. .............................. 138/178; 138/177; 23/284
[51] Int. Cl.² ........................................... F16L 9/10
[58] Field of Search .......... 138/177, 178, DIG. 11; 165/177, 179; 65/23, DIG. 9; 23/284

[56] References Cited
UNITED STATES PATENTS

| | | | |
|---|---|---|---|
| 1,350,158 | 8/1920 | Hurlburt | 65/DIG. 9 |
| 1,635,439 | 7/1927 | Schram | 65/23 |
| 2,156,156 | 4/1939 | Mahlck | 65/23 X |
| 2,412,925 | 12/1946 | Stupakoff | 65/23 X |
| 2,514,722 | 7/1950 | Robinson | 23/284 X |
| 2,856,264 | 10/1958 | Dunn | 23/284 X |
| 2,952,527 | 9/1960 | Findley et al. | 23/284 X |
| 2,953,517 | 9/1960 | Whiteley et al. | 23/284 X |
| 3,057,701 | 10/1962 | Coates et al. | 23/284 |
| 3,582,288 | 6/1971 | Taylor et al. | 23/284 |
| 3,770,405 | 11/1973 | De Angelis | 65/23 |

FOREIGN PATENTS OR APPLICATIONS

| | | | |
|---|---|---|---|
| 612,519 | 11/1948 | United Kingdom | 65/23 |

Primary Examiner—Richard E. Aegerter
Assistant Examiner—James E. Bryant, III
Attorney, Agent, or Firm—Schuyler, Birch, Swindler, McKie & Beckett

[57] ABSTRACT

A gas distributor tube formed from a non-porous ceramic material having a generally axial passageway at least part of which is in the form of a helix. A treatment chamber or reactor is provided with a number of distributor tubes located in the base of the chamber to permit the introduction of a gas through the passageway of this distributor into the treatment chamber in which a solid material in finely divided form may be maintained in fluid suspension.

10 Claims, 4 Drawing Figures

DISTRIBUTORS

This invention relates to an improved distributor tube particularly for introducing and distributing a gas into a treatment chamber or reactor such as a fluid bed reactor.

According to the present invention a gas distributor tube has a moulded tube-like body formed for a substantially non-porus ceramic material, one end of which is adapted to be mounted on a base plate, said tube-like body having a passageway extending through the body with at least that part of the passageway adjacent the end to be remote from the base plate shaped to form a helical passage within said body.

According to the present invention also a treatment chamber comprises a surrounding wall and a base plate having a number of perforations, each perforation registering with one end of a gas distributor tube formed of a substantially non-porous ceramic material and extending inwardly of the chamber from the base plate, said distributor tube having a passageway extending through the body of the tube with at least that portion of the passageway adjacent the inner end of the distributor tube shaped to form a helical passage within said body and means to supply a gas to the passageway adjacent the end of the distributor tube registering with the base plate.

The present invention provides a gas distributor tube and a treatment chamber or reactor of new and simple construction in which flow of materials from the chamber into the passageway through which a gas is introduced into the chamber is minimised. In addition erosion of the gas distributor tube at its inner end within the treatment chamber does not substantially alter the actual shape of the passageway presented to the inner portion of the treatment chamber so that the distribution of the gas across the base of the chamber is substantially unaltered.

The gas distributor tube will usually be a one piece moulding and will be formed of a substantially non-porous material resistant to the gas being introduced through the passageway and to the high temperatures usually employed in the treatment chamber. For this reason it is usual to form the distributor tube of ceramic material such as silica, alumina or alumino silicate. The gas distributor tube is adapted at one end to register with a perforation of the base plate of the treatment chamber and usually, for convenience, will be shaped to be held securely within the perforation in the desired special location.

The passageway extending through the body of the gas distributor tube is shaped so as to provide at the inner end of the gas distributor tube a helical passage. This passage is formed by the shape of the passageway itself and not by providing the passageway with any form of insert. Typically the passageway will have a circular cross-section and a diameter of from 0.25 inch to 0.5 inch, although this will depend on the desired gas flow and on the size of any particles of solid material present in the treatment chamber or reactor. Conveniently the helical passageway can be formed along at least half the length of the gas distributor tube, but usually will extend to at least one quarter of its length from the inner end of the gas distributor tube. Usually the passageway extending from the end of the tube adjacent the base plate will be a substantially straight axial passageway until joining with the helix.

The base plate is provided with a number of perforations depending on the size of the treatment chamber and a gas distributor tube of the present invention will usually be mounted in each of the perforations. The spaces between the gas distributor tube when mounted in the base plate is usually filled by a ceramic material so that preferably the inner surface of the assembly of gas distributor tubes is substantially smooth and flat.

The means to supply a gas to the passageway can be a common supply source such as a wind box mounted beneath the base plate which is supplied by gas via a gas supply main or an individual supply means may be provided for each distributor tube, e.g. separate gas supply pipes from a gas supply main.

Preferably some pressure reducing means are provided between the gas supply means and the passageway so that there is a pressure drop between the gas supply means and the passageway of at least equal to half the pressure drop across the bed of material to be maintained in the treatment chamber. When the gas supply means is a wind box the end of the passageway through the distributor tube adjacent the base plate can be supplied with gas via an orifice of appropriate size to effect the desired pressure drop. When separate gas supply means are provided to each distributor tube an appropriate valve may be employed to effect the pressure drop.

Treatment chambers or reactors in accordance with the present invention are particularly suitable for use in the production of volatile metal chlorides such as titanium tetrachloride by the high temperature chlorination of a chlorinatable ore in which the ore is maintained in a fluid suspension within the reactor by the introduction through the base of the reactor of a chlorine containing gas. The gas distributor tube can be used in any apparatus which requires the introduction of a gas into a solid medium contained within the chamber and indeed may be used for treatments in which chemical reactions do not take place. For instance, the gas distributor tube may be used to introduce a fluidising gas into a bed of an inert particulate material which is used in the heat treatment of particles or material at an elevated temperature.

One form of apparatus constructed in accordance with the present invention will now be described by way of example only with reference to the accompanying drawings in which.

Figure 1:
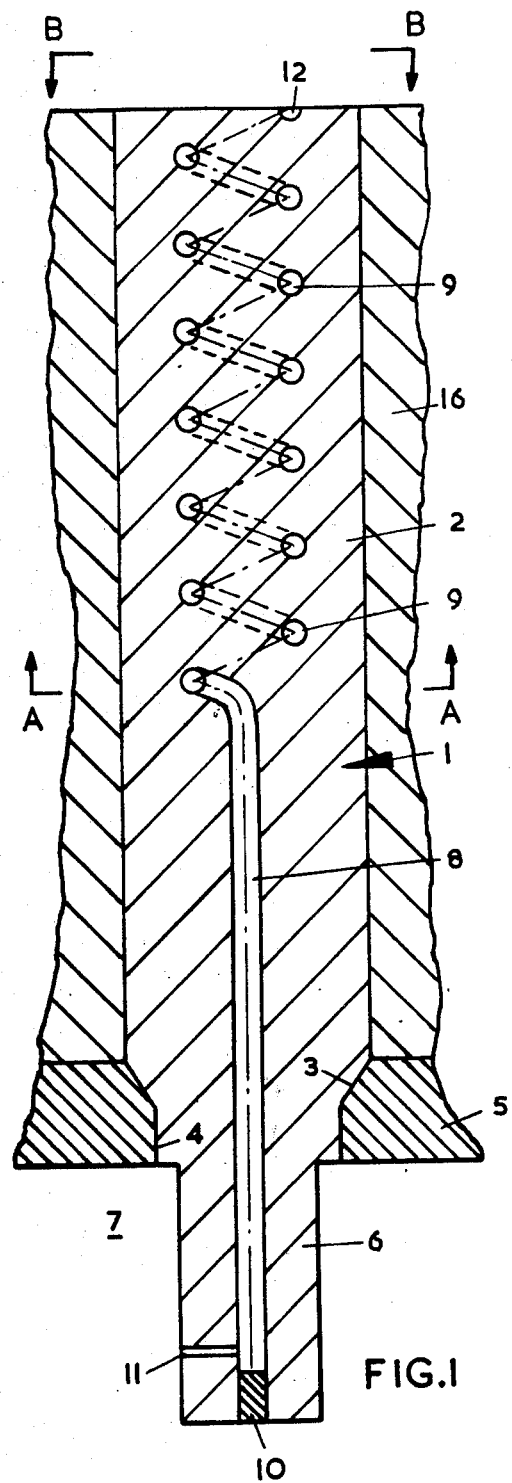
FIG. 1 is a diagrammatic section through a portion of the base of a reactor.
Figure 2:
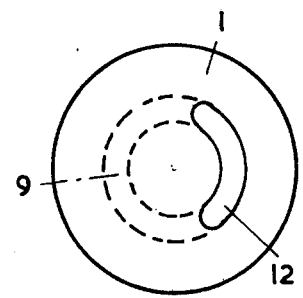
FIG. 2 is a view of the line BB of FIG. 1.
Figure 3:
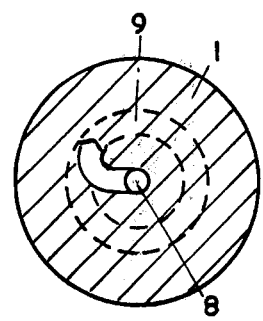
FIG. 3 is section along the line AA of FIG. 1.

As shown in FIGS. 1, 2 and 3 the gas distributor tube 1 consists of a tubular body member 2 formed of concrete shaped at 3 to fit within an aperture 4 of a perforated base plate 5. The tubular body member 2 extends below the base plate 5 to form a narrow diameter portion 6 which lies within a wind box 7. The lowermost half of the tubular body 2 has a central axial passage 8 of circular cross-section leading into a helical passage 9 which extends to the top of the tubular body 2. The lower end of the passageway 8 is closed by a plug 10 and a radial passage 11 to provide the desired pressure drop is provided to communicate with the wind box 7 and the passageway 8 at a point above the upper surface of the plug 10. The shape of the outlet 12 of the passageway 9 is a curved oval as shown in FIG. 2.

Figure 4:
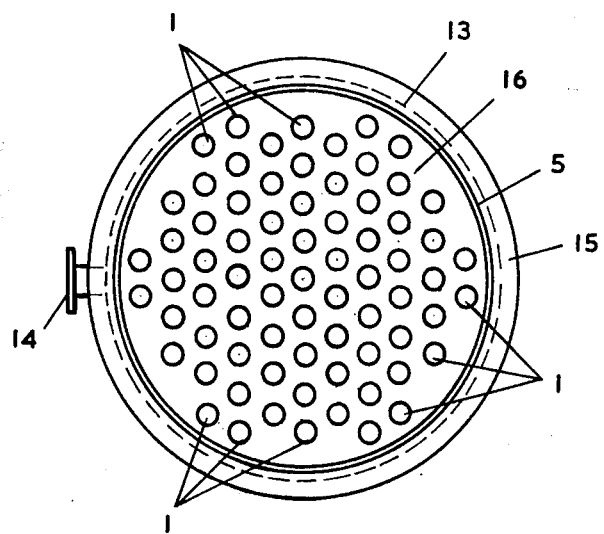
FIG. 4 is a plan view of the base of the reactor shown in FIG. 1.

FIG. 4 shows the base plate 5 mounted above a wind box 13 which is provided with a supply of the gas through an inlet pipe 14. The base plate 5 has a flange 15 for attachment to the reactor proper. The base plate 5 is perforated and each perforation carries a gas distribution tube 1. Only some of the gas distribution tubes are numbered but it is to be understood that each perforation carries a gas distribution tube as shown in FIG. 1.

The space between each tube 1 is filled with ceramic material 16. The gas distribution tube may be formed by casting or moulding the ceramic material in a suitably shaped mould with a core shape to correspond to the desired passageway. For instance when the passageway is required to have a diameter of, say, 0.375 inch then the core may consist of a length of wire of diameter 0.125 inch having an outer sleeve of a thermo-plastic material such as polyvinyl chloride or polyethylene having a thickness of 0.125 inch. For ease of manufacture it is desirable that the wire insert should be divided at the junction of the helical portion and the axial straight portion. After the gas distribution tube has been cast the wire core can be removed by screwing outwardly the wire insert from the helical shaped passageway and by pulling directly downwardly the straight wire portion leaving the sheath of thermo-plastic in situ. This thermo-plastic can be removed by burning in the presence of oxygen.

Alternatively the helical passageway may be formed by coating the helically shaped wire with a wax of low melting point, e.g. about 100° C, and, after casting, melting out the wax and thereafter removing the wire by screwing outwardly.

A reactor having gas distribution tubes arranged as shown in FIG. 4 and also having cylindrical walls provided with a suitable ceramic lining is particularly useful for the chlorination of a chlorinatable titanium bearing ore such as mineral rutile or ilmenite. A charge of powdered mineral rutile together with coke is placed in the reactor and, initially air is supplied to the wind box 7, and to the passageway 8 to fluidise the charge within the reactor. A flame is applied to the surface of the material in the reactor to ignite the coke. When the temperature reaches 700° C combustion of the coke proceeds in the absence of the flame and when the temperature has reached 900° C the air is shut off and chlorine admitted to the wind box.

Chlorination of the mineral rutile takes place to produce titanium tetrachloride which is removed from the reactor and at the same time further charges of a mixture of mineral rutile and coke are made to promote a continuous running of the reactor for an extended period.

Erosion of the base plate assembly only takes place slowly and evenly across the surface of the assembly of gas distribution tubes and only a small amount of powdered material falls into the passageways. Since the tubes do not project inwardly of the base there is no danger of breakage of an inwardly projecting portion.

What is claimed is:

1. In a gas distributor tube used in a fluidized bed treatment chamber to deliver a fulidizing gas to a fluidized bed of finely divided material; the improvement comprising said tube comprising a one-piece, molded, tube-like body having oppositely disposed first and second ends, said second end of said body being substantially flat, said body being formed of a substantially non-porous ceramic material; said first end being adapted to be mounted on a fluidized bed treatment chamber base plate with said second end disposed toward the interior of said chamber; means molded therein for passage of a fluidizing gas through said tube, said passage means extending through said body and forming a molded passageway; said passageway having an entrance adjacent said first end of said body and an outlet in said second end of said body, pressure reducing means at said entrance to said passageway, said passageway further comprising means molded integrally therewith for substantially preventing the downward flow of particulate material through said gas distributor tube; said downward flow preventing means comprising said molded passageway immediately adjacent said second end of said body being shaped to form a helical passage capable of substantially preventing the downward flow of particulate material therethrough; said passage being of circular cross section and having a diameter of from 0.25 inches to 0.5 inches; said helical passage being configured such that the shape of said outlet in said substantially flat second end is an elongated, arcuately curved oval; whereby the amount of finely divided material which can fall from the treatment chamber into the passageway is minimized, and erosion of said second end of said tube-like body does not substantially alter the shape of the passageway presented to the interior of the treatment chamber.

2. A gas distributor tube according to claim 1 in which said moulded tube-like body is a one piece moulding.

3. A gas distributor tube according to claim 1 in which the helical passage extends along the length of the tube-like body for at least one-quarter of the length of the tube-like body.

4. A gas distributor tube according to claim 3 in which the helical passage extends along the length of the tube-like body for at least half the length of the said tube-like body.

5. A gas distributor tube according to claim 1 which the passageway extending from the end of the tube-like body adapted to be mounted on a base plate is a substantially straight axial passageway.

6. A gas distributor tube according to claim 1 in which the tube-like body is formed of silica.

7. A gas distributor tube according to claim 1 in which the tube-like body is formed of alumina.

8. A gas distributor tube according to claim 1 in which the tube-like body is formed of alumino silicate.

9. A gas distributor tube according to claim 1 in which said ceramic material is resistant to temperatures of at least 900° C.

10. A gas distributor tube according to claim 1 wherein the axis of the helix defined by said helical passage is generally parallel to the axis of said tube-like body.

* * * * *

UNITED STATES PATENT OFFICE
CERTIFICATE OF CORRECTION

Patent No. 4,023,597    Dated  May 17, 1977

Inventor(s) James Dennis Groves and Harold Edward Haigh

It is certified that error appears in the above-identified patent and that said Letters Patent are hereby corrected as shown below:

Claim 1, line 2, "fulidizing" should read -- fluidizing --.

Signed and Sealed this

Second Day of May 1978

[SEAL]

Attest:

RUTH C. MASON
Attesting Officer

LUTRELLE F. PARKER
Acting Commissioner of Patents and Trademarks